United States Patent
Mori et al.

(10) Patent No.: US 6,274,194 B1
(45) Date of Patent: Aug. 14, 2001

(54) HYDROGEN ABSORBING ALLOY POWDER AND METHOD FOR PRODUCING HYDROGEN ABSORBING ALLOY POWDER

(75) Inventors: Toshihiro Mori, Okazaki; Hideki Iba, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/230,985

(22) PCT Filed: Sep. 26, 1997

(86) PCT No.: PCT/JP97/03449

§ 371 Date: Feb. 3, 1999

§ 102(e) Date: Feb. 3, 1999

(87) PCT Pub. No.: WO98/13158

PCT Pub. Date: Apr. 2, 1998

(30) Foreign Application Priority Data

Sep. 26, 1996 (JP) ................................. 8-254794
Feb. 27, 1997 (JP) ................................. 9-043691
Apr. 24, 1997 (JP) ................................. 9-107555

(51) Int. Cl.[7] ................................. B22F 1/02; B22F 9/08
(52) U.S. Cl. ............... 427/216; 427/255.29; 427/255.39; 420/900; 148/513
(58) Field of Search ................... 428/472, 469, 428/403; 427/216, 255.29, 255.39; 420/900; 148/513

(56) References Cited

U.S. PATENT DOCUMENTS

| | | | |
|---|---|---|---|
| 4,909,838 | * | 3/1990 | Haddad . |
| 5,305,714 | * | 4/1994 | Sekiguchi et al. ................ 123/3 |
| 5,591,542 | * | 1/1997 | Sakamoto et al. ................ 429/192 |
| 5,599,742 | * | 2/1997 | Kadomura ..................... 437/194 |
| 5,707,756 | * | 1/1998 | Inoue et al. .................... 429/57 |
| 5,712,062 | * | 1/1998 | Yamana et al. .................. 429/218 |
| 5,830,603 | * | 11/1998 | Oka et al. ..................... 429/249 |
| 5,837,319 | * | 11/1998 | Moriwaki et al. ................ 427/217 |
| 5,968,291 | * | 10/1999 | Iba et al. . |

FOREIGN PATENT DOCUMENTS

| | | |
|---|---|---|
| 60-224705 | 11/1985 | (JP) . |
| 5-213601 | 8/1993 | (JP) . |
| 9-278401 | 10/1997 | (JP) . |

OTHER PUBLICATIONS

T. Shimizu, "Method for Activating Hydrogen Storage Alloy", Abstract of JP–A–62–167201, published Jul. 23, 1987.

(List continued on next page.)

Primary Examiner—Deborah Jones
Assistant Examiner—Jennifer McNeil
(74) Attorney, Agent, or Firm—Burns, Doane, Swecker & Mathis, LLP (57) ABSTRACT

The present invention relates to a surface treatment for hydrogen-absorbing alloy. More particularly, the present invention relates to a surface treatment for hydrogen-absorbing alloy by which the poisoning resistance of a surface of alloy powder with respect to oxide film, water or absorbing gas can be enhanced so that activation treatment can be easily conducted on alloy powder. In the method, the poisoning resistance is enhanced by forming a protective film, which contains at least one of sulfide and fluoride, on the surface of hydrogen-absorbing alloy powder in an atmosphere containing $SF_6$ gas when hydrogen-absorbing alloy is crushed or hydrogen-absorbing alloy is in a state of powder or when hydrogen-absorbing alloy is made into powder by rapidly cooling and solidifying. Further, the above method includes: a process in which hydrogen-absorbing alloy is accommodated in a container and crushing of hydrogenation is conducted on the alloy in an atmosphere of hydrogen; a process of dehydrogenation in which gases are withdrawn from the container; and a process in which heat treatment is conducted in the container, wherein the atmosphere in the container contains $SF_6$ gas.

12 Claims, 8 Drawing Sheets

OTHER PUBLICATIONS

I. Kanekawa, "Manufacture of Hydrogen Storage Alloy Electrode", Abstract of JP–A–3–93160 published Apr. 18, 1991.

Tetsuo et al, "Production of Hydrogen Storage Alloy Powder", Patent Abstracts of Japan, Publication No. 06240310A, Aug. 30, 1994.

Takashi et al, "Production of Magnesium Series Hydrogen Storage Alloy", Patent Abstracts of Japan, Publication No. 06306504A, Nov. 1, 1994.

S. Seijiro, "Method for Stabilizing Hydrogen Occlusion Alloy", Patent Abstracts of Japan, Publication No. 07207493A, Aug. 8, 1995.

Akira et al, "High Activation and Stabilization Treatment of Hydrogen Storage Metallic Materials", Patent Abstracts of Japan, Publication No. 08183601A, Jul. 16, 1996.

N. Tatsuo, "Manafacture of Hydrogen Storage Alloy Powder Having Oxidation Resistance", Patent Abstracts of Japan, Publication No. 08291301A, Nov. 5, 1996.

Copy of International Search Report, International Application No. PCT/JP97/03449.

* cited by examiner

HYDROGEN ABSORBING ALLOY POWDER AND METHOD FOR PRODUCING HYDROGEN ABSORBING ALLOY POWDER

TECHNICAL FIELD

The present invention relates to a hydrogen-absorbing alloy powder and a method for producing the the powder. More particularly, the present invention relates to a surface treatment method for treating hydrogen-absorbing alloy powder by which oxidation of the hydrogen-absorbing alloy powder can be prevented and its property of poisoning resistance can be enhanced when $SF_6$ gas or an inert gas containing $SF_6$ gas is used as an atmosphere in a rapid cooling and solidification process and/or heating treatment and also when $SF_6$ gas or an inert gas containing $SF_6$ gas is used as an atmosphere in a crushing process so that the poisoning property with respect to an oxide film formed on powder surface, water content, absorbed gas or the like can be improved in the case of handling in the atmosphere and an activation treatment can be conducted easily.

BACKGROUND ART

It is possible for a hydrogen-absorbing alloy to absorb and desorb hydrogen reversely, and therefore a hydrogen-absorbing alloy is used for a heat pump, etc., in which an endothermic reaction caused in the process of desorbing hydrogen is used, as well as in an energy storage tank and in a nickel-hydrogen battery.

When a hydrogen-absorbing alloy is used, first, it is necessary to conduct an activation treatment on the hydrogen-absorbing alloy so that the absorbing and desorbing rate of hydrogen can be enhanced. Usually, the activation treatment is conducted as follows. While a container into which alloy powder is charged is being heated, air is drawn from the container. After that, absorbing and desorbing of hydrogen is repeated several times. Due to the foregoing operation, the activation treatment can be completed. However, the above treatment conditions and the times of treatment depend upon the type of hydrogen-absorbing alloy and the circumstances of the poisoning of the surface of alloy.

The process of producing a hydrogen-absorbing alloy usually includes melting, casting, heat-treating and crushing. In this case, crushing is conducted by a jaw crusher, roller crusher, etc., in two or three stages in accordance with the grain size of such hydrogen-absorbing alloy powder. For the prevention of oxidation of the surface of hydrogen-absorbing alloy powder, argon gas is frequently used as the atmosphere in this crushing process. When hydrogen-absorbing alloy powder is produced in the atmosphere of inert gas by means of mechanical crushing, gas atomization or hydrogenation-crushing, it has a clean surface. As long as the surface of hydrogen-absorbing alloy powder is clean, it is possible to conduct an activation treatment relatively easily. However, when the thus produced powder of a hydrogen-absorbing alloy is charged into a container for practical use, the hydrogen-absorbing alloy powder is exposed to air in many cases. At this time, the surface of the hydrogen-absorbing alloy powder is polluted with an oxide film, water and absorbed gases. For the above reasons, it becomes difficult to conduct the activation treatment. As a countermeasure to solve the above problems, for example, Japanese Unexamined Patent Publication (Kokai) No. 6-240310 discloses a method in which hydrogen-absorbing alloy powder is finely crushed by an high compressive pressure-tight type roller mill in a nonoxidizing atmosphere. According to this method, it is possible to prevent oxidation of the surface of hydrogen-absorbing alloy powder in the process of crushing, however, it is impossible to enhance poisoning resistance after the completion of crushing, that is, it is impossible to protect the surface of hydrogen-absorbing alloy powder after the completion of crushing.

On the other hand, the following surface treatment methods for enhancing poisoning resistance of hydrogen-absorbing alloy powder have been disclosed. For example, Japanese Unexamined Patent Publication (Kokai) No. 7-207493 discloses a method in which electrolytic treatment is conducted in an alkaline solution containing fluorine ions while a hydrogen-absorbing alloy is used as a cathode. Also, Japanese Unexamined Patent Publication (Kokai) No. 62-167201 discloses a method in which hydrogen is absorbed into and desorbed from a hydrogen-absorbing alloy and then CO gas is adsorbed onto the surface of the hydrogen-absorbing alloy. However, the former method is not appropriate for surface treatment of a hydrogen-absorbing alloy containing aluminum or vanadium which tends to dissolve in an alkaline solution. Further, when the former method is adopted, it is necessary to provide an electrolytic processing tank, a vaporizing and solidifying apparatus used after electrolytic treatment and a plant for waste solution, which become factors which raise the production cost of producing the alloy.

When the latter treatment method is adopted, the hydrogen-absorbing alloy can be easily reactivated with drawing the vacuum and by absorbing and desorbing hydrogen gas. As described above, the poisoning resistance of the hydrogen-absorbing alloy has not reached a satisfactorily high level at present. On the other hand, the surface protection effect is not sufficient according to conditions of storage, as a result there is a problem in poisoning resistance. Therefore, the development of a surface treatment technique for enhancing the poisoning resistance of hydrogen-absorbing alloys has been desired.

SUMMARY OF THE INVENTION

It is an object of the present invention to enhance poisoning resistance by a simple method such as heating in a treatment gas atmosphere by investigating a method by which poisoning is prevented in the case where hydrogen-absorbing alloy powder is once taken out into air and polluted with oxide film, water and absorbed gas.

It is another object of the present invention to provide a composition of a gas which is most effective for enhancing poisoning resistance, and to optimize a gas treatment method which enables industrial application and satisfies environmental problems and safety requirements in the process of treatment.

It is still another object of the present invention to simplify the treatment of poisoning resistance by adjusting the atmosphere in an accommodating container from the crushing process to the treatment process to make a closed system in which it is unnecessary to take out the hydrogen-absorbing alloy into air.

It is still another object of the present invention to provide hydrogen-absorbing alloy powder and a producing method thereof by which the producing process can be simplified and the producing cost can be reduced to combine the crushing process of the hydrogen-absorbing alloy with the gas treatment process.

It is still another object of the present invention to sufficiently prevent oxidation of the hydrogen-absorbing alloy even in the case of a container, the airtightness of which is not sufficient, when a gas, the specific gravity of which is higher than that of argon, is used in the crushing process of the hydrogen-absorbing alloy.

It is still another object of the present invention to provide hydrogen-absorbing alloy powder and a producing method thereof by which the producing process can be simplified and the producing cost can be reduced when the hydrogen-absorbing alloy powder producing process and/or heat-treatment process is combined with the gas treatment process.

In order to accomplish the above objects, the present invention provides the following.

(1) Hydrogen-absorbing alloy powder, the poisoning resistance of which is high, comprising a protective film containing at least one of sulfide and fluoride generated on a surface of hydrogen-absorbing alloy by the contact of $SF_6$ gas with the surface of the hydrogen-absorbing alloy.

(2) A method for producing hydrogen-absorbing alloy powder, the poisoning resistance of which is high, comprising the step of making the hydrogen-absorbing alloy come into contact with $SF_6$ gas or an inert gas containing $SF_6$ gas so as to form a protective film containing at least one of the sulfide and fluoride on the surface of hydrogen-absorbing alloy.

(3) A method for producing hydrogen-absorbing alloy powder described in the above item (2), further comprising the step of conducting heating treatment on crushed hydrogen-absorbing alloy powder in an atmosphere of $SF_6$ gas or an inert gas containing $SF_6$ gas so as to form a protective film containing at least one of sulfide and fluoride on the surface of the hydrogen-absorbing alloy.

(4) A method for producing hydrogen-absorbing alloy powder described in the above item (3), further comprising the steps of: conducting hydrogenation-crushing when the hydrogen-absorbing alloy is accommodated in a container and the atmosphere in the container is hydrogen; and conducting the heating treatment in the container in which the atmosphere is $SF_6$ gas or an inert gas containing $SF_6$ gas.

(5) A method for producing hydrogen-absorbing alloy powder described in the above item (2), further comprising the step of crushing a hydrogen-absorbing alloy when the hydrogen-absorbing alloy is accommodated in a container and the atmosphere in the container is $SF_6$ gas or an inert gas containing $SF_6$ gas so as to form a protective film containing at least one of sulfide and fluoride on the surface of the hydrogen-absorbing alloy.

(6) A method for producing hydrogen-absorbing alloy powder described in the above item (5), further comprising the step of heating the hydrogen-absorbing alloy when the hydrogen-absorbing alloy is crushed.

(7) A method for producing hydrogen-absorbing alloy powder described in the above time (6), wherein a portion close to the surface of the hydrogen-absorbing alloy is heated when it is crushed.

(8) A method for producing hydrogen-absorbing alloy powder described in the above item (2), wherein molten metal is injected by an injection nozzle from a container accommodating molten metal into the atmosphere of $SF_6$ gas or an inert gas containing $SF_6$ gas so that molten metal can be rapidly cooled and solidified.

(9) A method for producing hydrogen-absorbing alloy powder described in the above item (2), wherein molten metal is injected by an injection nozzle from a container accommodating molten metal so that molten metal can be rapidly cooled and solidified and made into the hydrogen-absorbing alloy powder, and the hydrogen-absorbing alloy powder is heated in the atmosphere of $SF_6$ gas or an inert gas containing $SF_6$ gas.

(10) A method for producing hydrogen-absorbing alloy powder described in the above item (2), wherein molten metal is injected by an injection nozzle from a container accommodating molten metal into the atmosphere of $SF_6$ gas or inert gas containing $SF_6$ gas so that molten metal can be rapidly cooled and solidified and made into the hydrogen-absorbing alloy powder, and the thus obtained hydrogen-absorbing alloy powder is heated in the atmosphere of $SF_6$ gas or an inert gas containing $SF_6$ gas.

BRIEF DESCRIPTION OF THE DRAWINGS

FIGS. 3(a) to 3(c) are views showing the treatment process relating to the first characteristic of the present invention, wherein FIG. 3(c) is a view showing the process of $SF_6$ gas treatment.

BEST MODE FOR CARRYING OUT THE INVENTION

The first characteristic of the present invention is described as follows. It is assumed that a film of sulfide or fluoride is formed on the surface of alloy powder when hydrogen-absorbing alloy powder is heated in the atmosphere of $SF_6$ gas. When a film of sulfide or fluoride is formed on the surface of hydrogen-absorbing alloy powder, the poisoning resistance of the powder can be enhanced, the surface is clean because the hydrogen-absorbing alloy powder is in a condition immediately after the producing process of mechanical crushing, gas atomization or crushing of hydrogeneration, and further even if the hydrogen-absorbing alloy powder is once exposed to the air, it is possible to activate it. Accordingly, there is no possibility of poisoning, and the hydrogen-absorbing alloy powder can be treated in the air.

When hydrogen-absorbing alloy powder, the surface of which is clean because the hydrogen-absorbing alloy powder is in a condition, immediately after the producing process of mechanical crushing, gas atomization or hydrogenation-crushing, of being heat treated at 400 to 500°

C. in $SF_6$ gas or an inert gas containing $SF_6$ gas without being exposed to a poisoning atmosphere, it is assumed that a film of sulfide or fluoride, the thickness of which is several tens to several hundreds nanometers, is formed on the surface of the alloy powder. Due to the presence of this protective film, the hydrogen-absorbing alloy and air do not directly contact each other. Accordingly, even if the alloy powder is taken out into the air, poisoning of the alloy powder can be suppressed, and the alloy powder can be easily activated after it has been charged into a container for practical use. In the present invention, the alloy powder is defined as particles, the diameters of which are in a range from 30 to 100 $\mu$m.

When the treatment temperature is lower than 400° C., it is impossible to form a sufficiently strong protective film. Therefore, poisoning proceeds onto the surface of alloy powder in air. When the treatment temperature exceeds 500° C., the protective film becomes too strong. Therefore, it is difficult to conduct activation treatment on alloy powder.

Figure 3A:
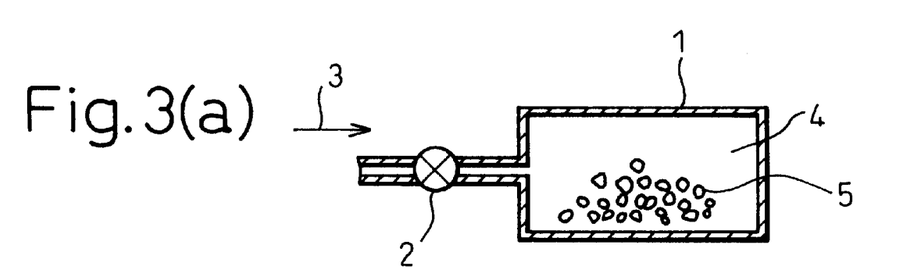
FIG. 3(a) is a view showing the process of hydrogenation-crushing.
Figure 3B:
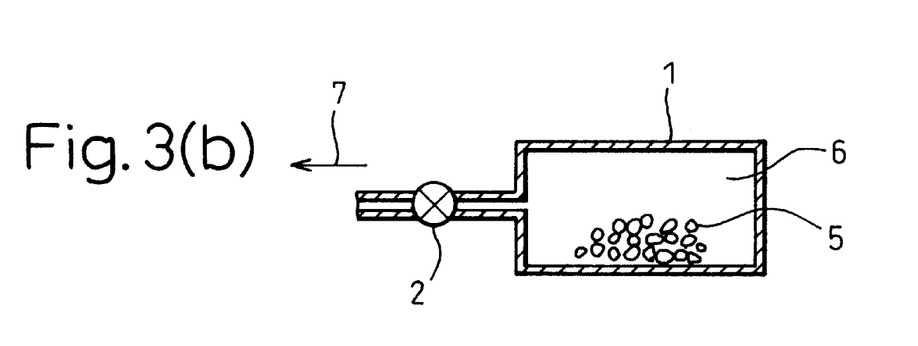
FIG. 3(b) is a view showing the process of dehydrogenation.
Figure 3C:
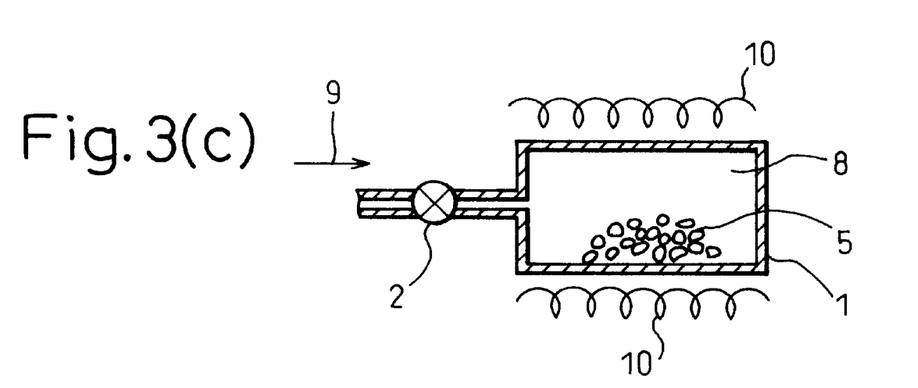

An example of the producing process of the present invention is shown in FIGS. 3(a) to 3(c). First, as shown in FIG. 3(a), hydrogen-absorbing alloy 5 is subjected to hydrogenation-crushing in the treatment chamber 1 into which the atmosphere 4 of hydrogen is charged while a quantity of hydrogen fed into the treatment chamber 1 is controlled by the flow control device 2. Next, as shown in FIG. 3(b), air is withdrawn from the treatment chamber 1, so that hydrogen, which has been absorbed in the alloy, is subjected to dehydrogenation by the vacuum 6. After that, $SF_6$ gas is supplied into the treatment chamber 1 via the flow control device 2 and, further, the treatment temperature is raised by the heater 10. Due to the foregoing, the formation of a sulfide film or fluoride film can be facilitated. The specific treatment conditions are described as follows. For example, when a Ti alloy is used, the treatment conditions are $SF_6$ gas: 700 torr, and heating temperature: 500° C.×1 hr.

Figure 1:
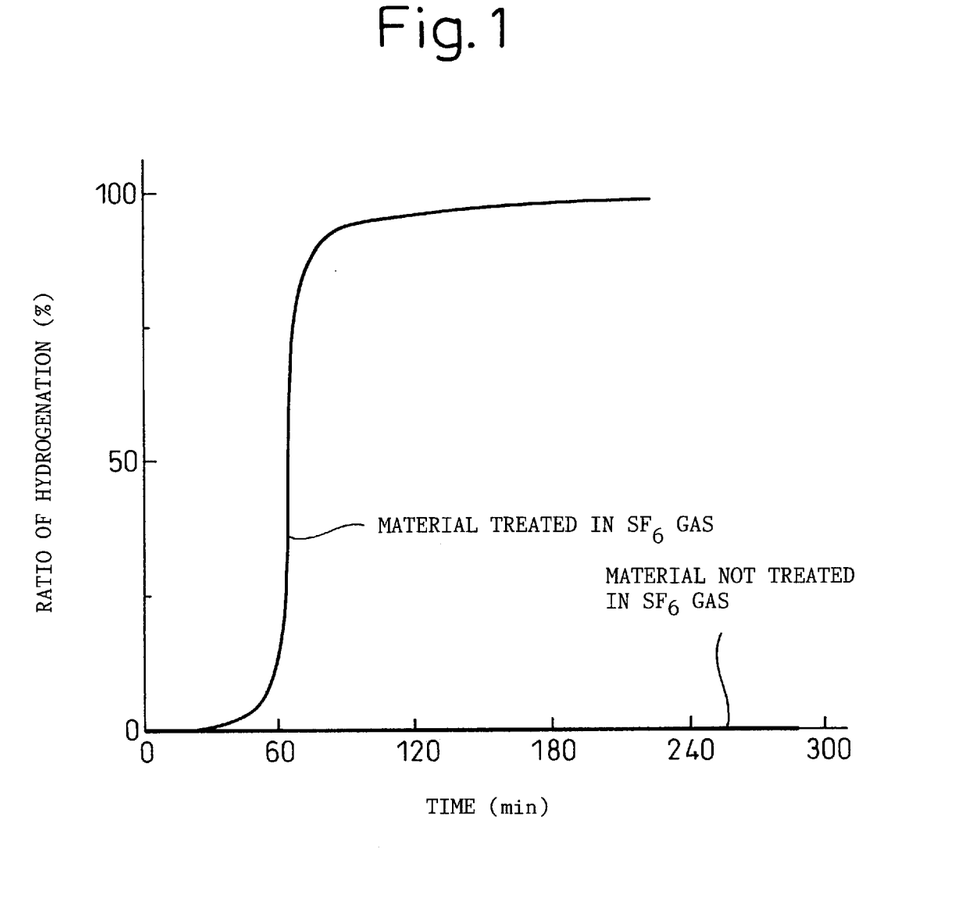
FIG. 1 is a graph showing the characteristic of hydrogenating activation of a material treated in $SF_6$ gas, which relates to the first characteristic of the present invention, and also showing the characteristic of a material not treated in $SF_6$ gas.

FIG. 1 is a graph showing the characteristic of hydrogenating activation of a material, the surface of which is treated in gas, and also showing the characteristic of a material not treated in gas. FIG. 1 shows a result of measurement conducted on a material which was left in the atmosphere after the treatment and measured after one day, wherein a relation between the time and the quantity of hydrogenation is shown on the graph of FIG. 1 when the temperature was 0° C. and the pressure was 1 MPa. As shown on the graph of FIG. 1, the treated material was activated after about 2 hours, however, the material not treated was not activated.

In this connection, poisoning of hydrogen-absorbing alloy is defined as follows in the present invention. For example, in a chemical reaction process conducted in a battery, when the alloy comes into contact with water or air, the effect of activation of the alloy itself is deteriorated, and further the entire characteristic of the hydrogen-absorbing alloy is damaged. The above phenomenon is defined as poisoning in the present invention. The mechanism of poisoning resistance according to the present invention is assumed to be as follows, however, the details are not known yet. The shielding effect to shield the surface can be provided by F atoms, and the formation of an oxide layer is suppressed by inducing a substitution reaction of O atoms with S atoms caused on a surface layer, so that H atoms can easily enter and hydrogenation activation treatment can proceed.

In this connection, the surface treatment method of the present invention can be applied not only to a hydrogen-absorbing alloy of the titanium system but also to hydrogen-absorbing alloys of rare earth elements and the magnesium and vanadium systems.

Next, the second characteristic of the present invention will be explained below.

According to the present invention, $SF_6$ gas is used in the process of crushing. $SF_6$ gas reacts with the alloy, so that a protective film is formed on the surface of the alloy. At this time, the protective film is formed on a newly made surface immediately after crushing. Therefore, it is possible to provide a great effect by the protective film. Further, the formation of a protective film is facilitated not only by the heat generated in the process of crushing but also by heating the hydrogen-absorbing alloy. In this case, generally speaking, the higher the temperature is, the higher the ductility is increased. Therefore, it becomes difficult to crush the alloy when the temperature is high. However, when only a portion close to the surface of the powder is heated, the ease of crushing can be compatible with the formation of a film.

As described above, it is assumed that a film of sulfide or fluoride is formed, on the surface of powder after crushing, when the alloy is crushed in the atmosphere containing $SF_6$ gas. Due to the foregoing, it is possible to enhance resistance to poisoning of powder having a clean surface which has been obtained immediately after mechanical crushing, and further even if powder is once exposed to air, it is possible to activate it. Accordingly, there is no possibility of poisoning, and it is possible to handle the hydrogen-absorbing alloy powder in air.

When the alloy is crushed in an atmosphere of $SF_6$ gas, a film of sulfide or fluoride, the thickness of which is in a range from several tens to several hundreds nanometers, is formed on the surface of powder. Due to the foregoing, the concentration of $SF_6$ gas must be maintained at 0.5 to 100% in the process of crushing. From the economical viewpoint, it is preferable that the concentration of $SF_6$ gas is maintained at a value lower than 10%. Examples of inert gas used together with $SF_6$ gas are argon and nitrogen which can be advantageously used from the economical viewpoint. No alloy is directly contacted with air by this protective film. Therefore, even if the alloy is taken out into the atmosphere, poisoning of the alloy is suppressed and the alloy is easily activated after it has been charged into a container for actual use.

In this connection, when the temperature is lower than 400° C. in the process of crushing, it is impossible to form a sufficiently strong protective film. Therefore, poisoning on the surface of alloy proceeds in air. When the temperature exceeds 500° C., the protective film becomes too strong. Therefore, it becomes difficult to conduct the activation treatment.

The mechanism of enhancing resistance to poisoning of the present invention is assumed to be as follows. A film of sulfide or fluoride formed on the surface of powder prevents the alloy from coming into contact with the poisoning substance. Further the film of sulfide or fluoride does not obstruct a chemical reaction of hydrogen with alloy.

Next, the third characteristic of the present invention is to use $SF_6$ gas in the process of producing powder in which an alloy is rapidly cooled and solidified. Alloy powder reacts with $SF_6$ gas due to the heat in the powder, so that a protective film can be formed. At this time, the protective film is formed on newly made surfaces of the powder. Therefore, a great effect can be provided by the protective film. Further, when powder is rapidly cooled and solidified in the heat treatment process, a protective film is formed in the same manner as that described above. It is assumed that a film of sulfide or fluoride is formed on the surface of the powder after the powder is treated in the atmosphere containing $SF_6$ gas. Due to the foregoing, it is possible to enhance poisoning resistance of a powder having a clean surface which has been obtained immediately after rapid-cooling and solidification, and further even if powder is once exposed to air, it is possible to activate it. Accordingly, there is no possibility of poisoning, and it is possible to handle the hydrogen-absorbing alloy powder in the air.

Referring to examples, the present invention will be further described in detail.

EXAMPLES

Example 1

Figure 2:
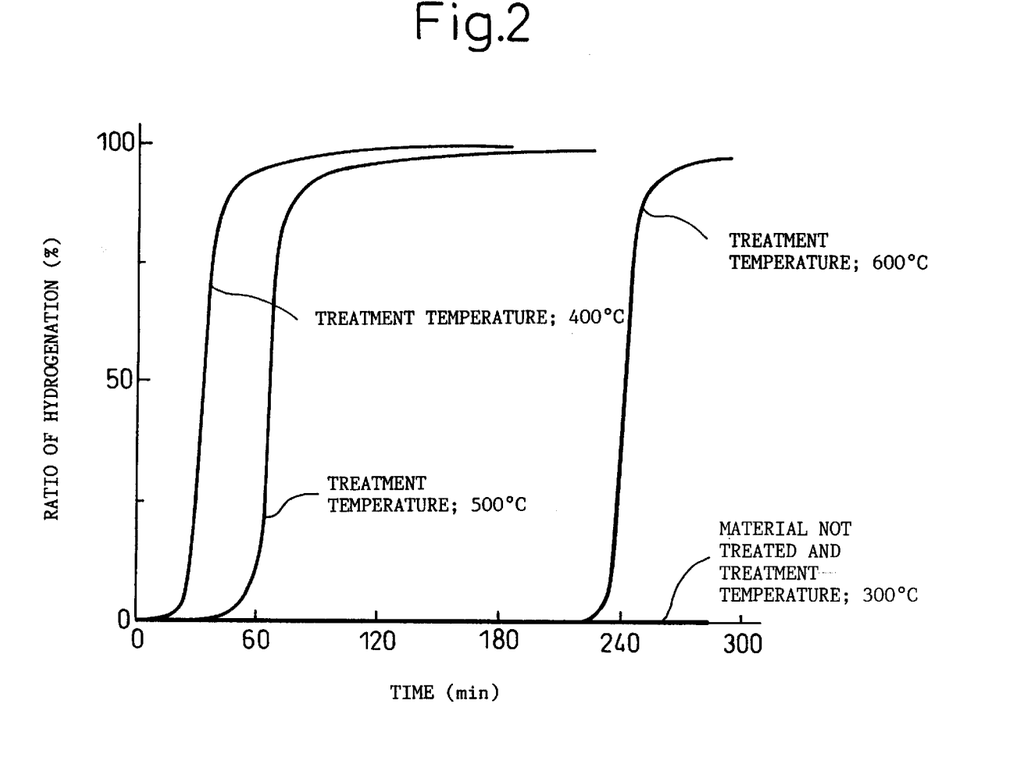
FIG. 2 is a graph showing a relation between the treatment time and the characteristic of hydrogenating activation at each treatment temperature relating to Example 1 of the present invention.

In this example, alloy powder, the grain size of which was not more than 40 mesh, was obtained as follows. Alloy of $Ti_{25}Cr_{35}V_{40}$ was produced by means of arc melting and subjected to heat treatment of 1200° C.×5hr. Then, alloy of $Ti_{25}Cr_{35}V_{40}$ was roughly crushed and then put into a pressure container made of stainless steel. Then, crushing of hydrogenation was repeatedly conducted on the alloy by several times under the condition of a vacuum of (60° C.×1 hr) and hydrogenation (0° C., 1 MPa×1 hr). Due to the foregoing, alloy powder was obtained. Next, air was withdrawn (60° C.×1 hr), so that hydrogen was desorbed from the alloy. After that, $SF_6$ gas (700 torr) was charged into the container, and a heating treatment was conducted for one hour at each temperature of 300° C. to 600° C. After the completion of treatment, alloy powder was taken out into air and left for one day in an environment in which the temperature was kept at 30° C. and the humidity was kept at 70%. After that, with respect to each alloy powder, the activation characteristic was evaluated under the activating condition of a vacuum (60° C.×1 hr) and hydrogenation (0° C., 1 MPa). The result of evaluation is shown on the graph of FIG. 2 in which a relation between the treatment temperature and the ratio of hydrogenation is shown at each surface treatment. In this case, a quantity of hydrogenation is 100% when alloy powder was not left in air and activation treatment was sufficiently conducted. As can be seen on this graph, when the treatment temperature was 400 to 500° C., the activation was attained in about 60 minutes, however, when the treatment temperature was 600° C., it required 4 hours to attain the activation. Further, in the case of a workpiece which had not been treated yet, the activation was not attained even after 4 hours or more had passed. It can be seen on the graph that the most appropriate treatment temperature was 400 to 500° C. in this example.

In this example, an alloy of $Ti_{25}Cr_{35}V_{40}$ was used as an sample, however, it is known that fluoride is formed in the reaction of $SF_6$ gas with various alloys. Due to the above knowledge, it is expected that the same effect as that described above can be provided in other hydrogen-absorbing alloys. Concerning the treatment gas, any gas, the primary component of which is S or F, can be basically used, for example, $SO_2$ or $CF_4$ can be basically used. However, from the viewpoint of enhancing resistance to poisoning with respect to oxygen and also from the viewpoint of preventing the environmental pollution, etc., it is most preferable to use $SF_6$ gas.

Example 2

This example relates to a method of forming a protective film on hydrogen-absorbing alloy powder during crushing of the powder. In this example, the crushing process of crushing hydrogen-absorbing alloy is conducted in the atmosphere of $SF_6$ gas or inert gas containing $SF_6$ gas.

Figure 4:
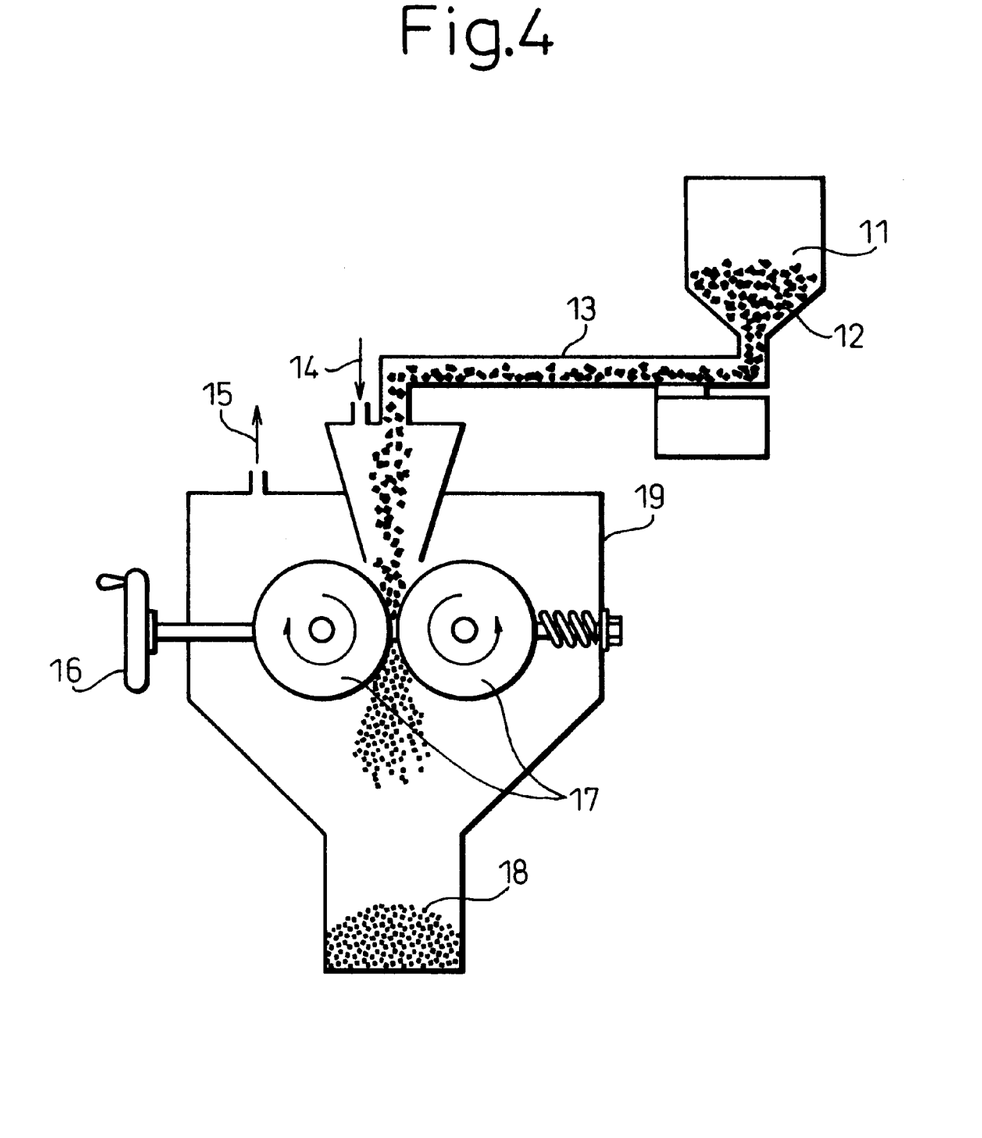
FIG. 4 is a view showing an outline of a crusher relating to Example 2 of the present invention.

FIG. 4 is a view showing a roller mill type crusher used in this example. In this view, alloy 12 is manufactured by arc melting. Alloys of $Ti_{25}Cr_{35}V_{40}$, $Ti_{33}Mn_{30}V_{37}$, $Ti_{36}Cr_{57}Mo_7$ or $Ti_{41}Cr_{56}W_3$, which have been subjected to heat treatment of 1200° C.×5 hr, are roughly crushed. After that, the thus crushed alloy is fed from the hopper 11 to the crusher 19 by the vibration feeder 13. The entire devices from the crusher 19 to the hopper 11 are in the atmosphere of $SF_6$ gas or inert gas containing $SF_6$ gas. Then, alloy 12 is crushed by the crushing rollers 17, the roller clearance of which is appropriately adjusted. After that, alloy is stored in the powder recovery container 18. In this connection, reference numeral 14 represents a gas supply, and reference numeral 15 represents a gas discharge. Table 1 shows compositions of alloy, methods of manufacturing powder and conditions of atmosphere of Nos. 1 to 6 of this example. Table 2 shows results of the number of times of activation treatment. In this connection, in this example, the grain size of alloy powder was not more than 40 mesh.

TABLE 1

| No. | Classification | Composition of alloy (at %) | Method for producing powder | Atmosphere condition |
|---|---|---|---|---|
| 1 | Example 2 | $Ti_{25}Cr_{35}V_{40}$ | Roller mill | $SF_6$ |
| 2 | " | " | " | Ar + 1 vf % $SF_6$ |
| 3 | " | " | " | $N_2$ + 1 vf % $SF_6$ |
| 4 | " | $Ti_{33}Mn_{30}V_{37}$ | " | " |
| 5 | " | $Ti_{36}Cr_{57}Mo_7$ | " | " |
| 6 | " | $Ti_{41}Cr_{56}W_3$ | " | " |
| 7 | Example 3 | $Ti_{25}Cr_{35}V_{40}$ | " | " |
| 8 | Example 4 | " | " | " |
| 9 | Comparative Example | " | " | In air |
| 10 | " | " | " | Ar |

TABLE 2

(Continuation of Table 1)

| No. | Classification | Heating condition | Number of times of activation treatment required after being left in air* |
|---|---|---|---|
| 1 | Example 2 | No | Once |
| 2 | " | " | Twice |
| 3 | " | " | " |
| 4 | " | " | Three times |
| 5 | " | " | Twice |
| 6 | " | " | " |
| 7 | Example 3 | Alloy is heated to 400° C. before crushing | Once |
| 8 | Example 4 | Roller used for crushing is heated to 400° C. | " |
| 9 | Comparative Example | No | No activation is caused even after 10 times |
| 10 | " | " | " |

*Being left in the atmosphere: Produced hydrogen-absorbing alloy powder was taken out into air and left in the environment for one day in which the temperature was kept at 30° C. and humidity was kept at 70%. Activation treatment: Cycle of vacuum drawing (60° C. × 1 h) and pressurization with hydrogen (0° C., 1 MPa × 1 h).

As can be seen from Table 2, activation treatment of the example of the present invention is simpler than that of the comparative example. Therefore, the number of times of activation treatment required after being left in the air is once to three times, that is, activation can be attained when activation treatment is conducted once to three times. Since $SF_6$ gas is used in this example, gas in the powder recovery container can be replaced smoothly even in the crusher, the airtightness of which is not sufficient, so that oxidation of the surface of alloy powder can be prevented and also a dust explosion can be prevented. Further, it is possible to form a protective film on the surface of alloy powder by the action of heat generated in the process of crushing and also by the action of $SF_6$ gas. Due to the protective film, resistance to poisoning can be enhanced after crushing, and the hydrogenation characteristic can be improved. In the above process, a protective film is formed on a newly made surface obtained immediately after crushing. From the above viewpoint, a great effect can be provided.

Example 3

This example relates to a method of forming a protective film on hydrogen-absorbing alloy powder during heating of the powder. In order to facilitate the formation of a protective film conducted by the treatment of $SF_6$ gas, the heated alloy is crushed in the crushing process of crushing hydrogen-absorbing alloy.

Figure 5:
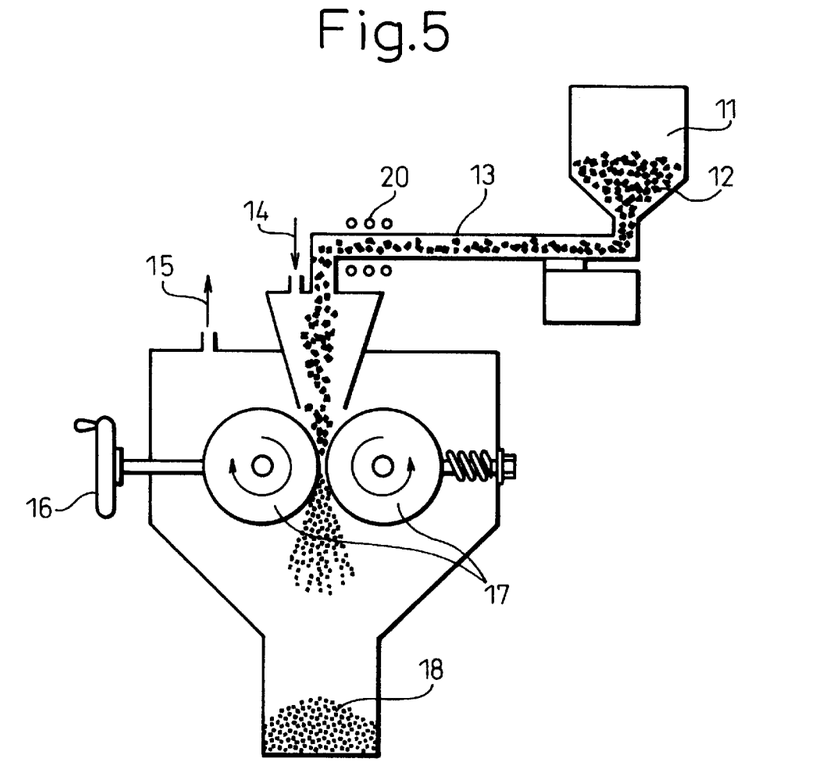
FIG. 5 is a view showing an outline of a crusher relating to Example 3 of the present invention.

A roller mill crusher of this example is shown in FIG. 5. In this view, alloy 12 is produced by arc melting. An alloy of $Ti_{25}Cr_{35}V_{40}$, which has been heat-treated under the condition of 1200° C.×5 hr, is roughly crushed. Then, alloy is fed from the hopper 11 to the crusher 19 by the vibration feeder 13, in the middle of which the induction heating coil 20 is arranged so that alloy can be heated. The entire devices from the crusher 19 to the hopper 11 are in the atmosphere of $SF_6$ gas or inert gas containing $SF_6$ gas. After alloy 12 has been heated by the induction heating coil 20, it is crushed by the crushing rollers 17, the roller clearance of which is appropriately adjusted, and stored in the powder recovery container. In this connection, reference numeral 14 represents a gas supply, and reference numeral 15 represents a gas discharge. Table 1 shows a composition of alloy, method of producing powder and condition of atmosphere of No. 7 of this example. Table 2 shows results of the number of times of activation treatment.

Figure 6:
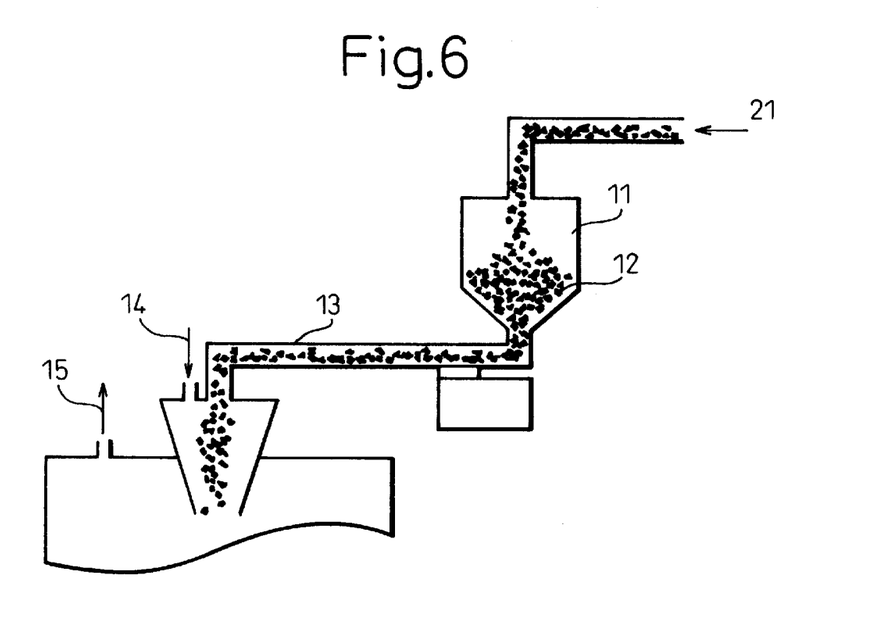
FIG. 6 is a view showing an outline of another crusher relating to Example 3 of the present invention.

As can be seen in Table 2, activation treatment of the example of the present invention is simpler than that of the comparative example. Therefore, the number of times of activation treatment required after being left in the air is once. In this connection, the heating method is not limited to the above method in which alloy is heated immediately before crushing by the induction heating coil, but as shown in FIG. 6, after the alloy has been subjected to homogenization heat treatment after the completion of melting and casting, it may be successively crushed. According to the latter method, it is unnecessary to conduct heating specially. Therefore, the latter method is economical.

Example 4

Figure 7:
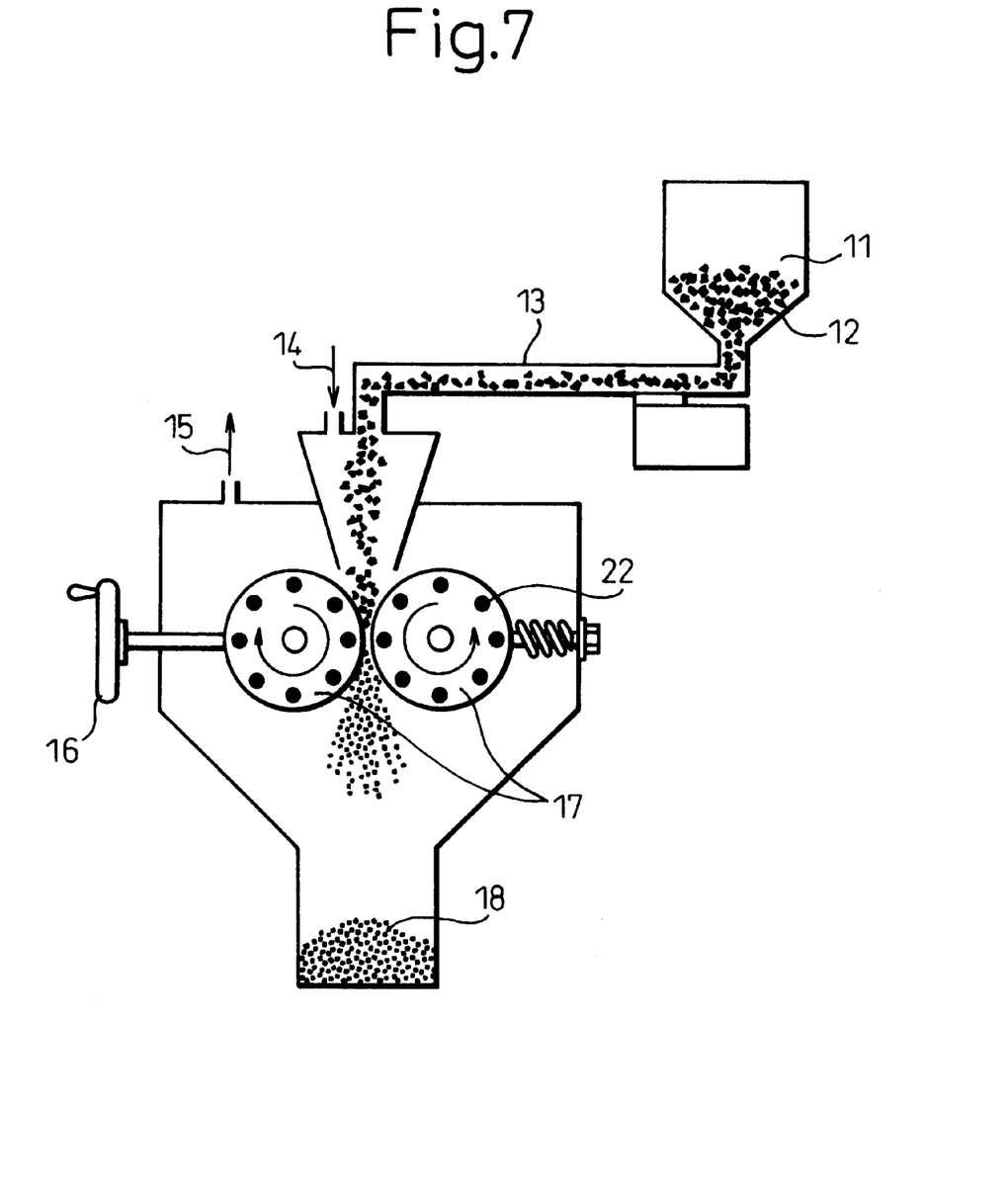
FIG. 7 is a view showing an outline of another crusher relating to Example 4 of the present invention.

In this example, in the same manner as that of Example 3, in order to facilitate the formation of a protective film conducted by the treatment of $SF_6$ gas, the alloy is crushed in the crushing process while the surface of alloy is being heated. As shown in FIG. 7, the heater 22 is embedded in the rollers of the roller mill crusher, so that alloy can be crushed by the heated roller mill.

In the same manner as that of Example 3, an alloy of $Ti_{25}Cr_{35}V_{40}$, which has been heat-treated, is roughly crushed. Then, the alloy is fed from the hopper 11 to the crusher 19 by the vibration feeder 13. The entire devices from the crusher 19 to the hopper 11 are in the atmosphere of $SF_6$ gas or inert gas containing $SF_6$ gas. Table 1 shows a composition of alloy, method of producing powder and condition of atmosphere of No. 8 of this example. Table 2 shows results of the number of times of activation treatment.

As can be seen in Table 2, activation treatment of the example of the present invention is simpler than that of the comparative example. Therefore, the number of times of activation treatment required after being left in the atmosphere is once. When crushing of the alloy is conducted by the roller mill in which the heater 22 is embedded so as to heat the crushing rollers, the surface of the powder is heated simultaneously with crushing, and a protective film is formed on the surface of the powder by a chemical reaction with $SF_6$ gas.

In general, there is a tendency that the higher the temperature of the metal is, the higher the ductility is increased. However, according to the above crushing method, it is possible to heat only the surface of the powder simultaneously with crushing. Therefore, the ease of crushing the alloy is not deteriorated according to the above crushing method. Especially, the above method is appropriate for the alloy, the ductility-brittleness transition temperature of which is not lower than the room temperature.

Example 5

Figure 8:
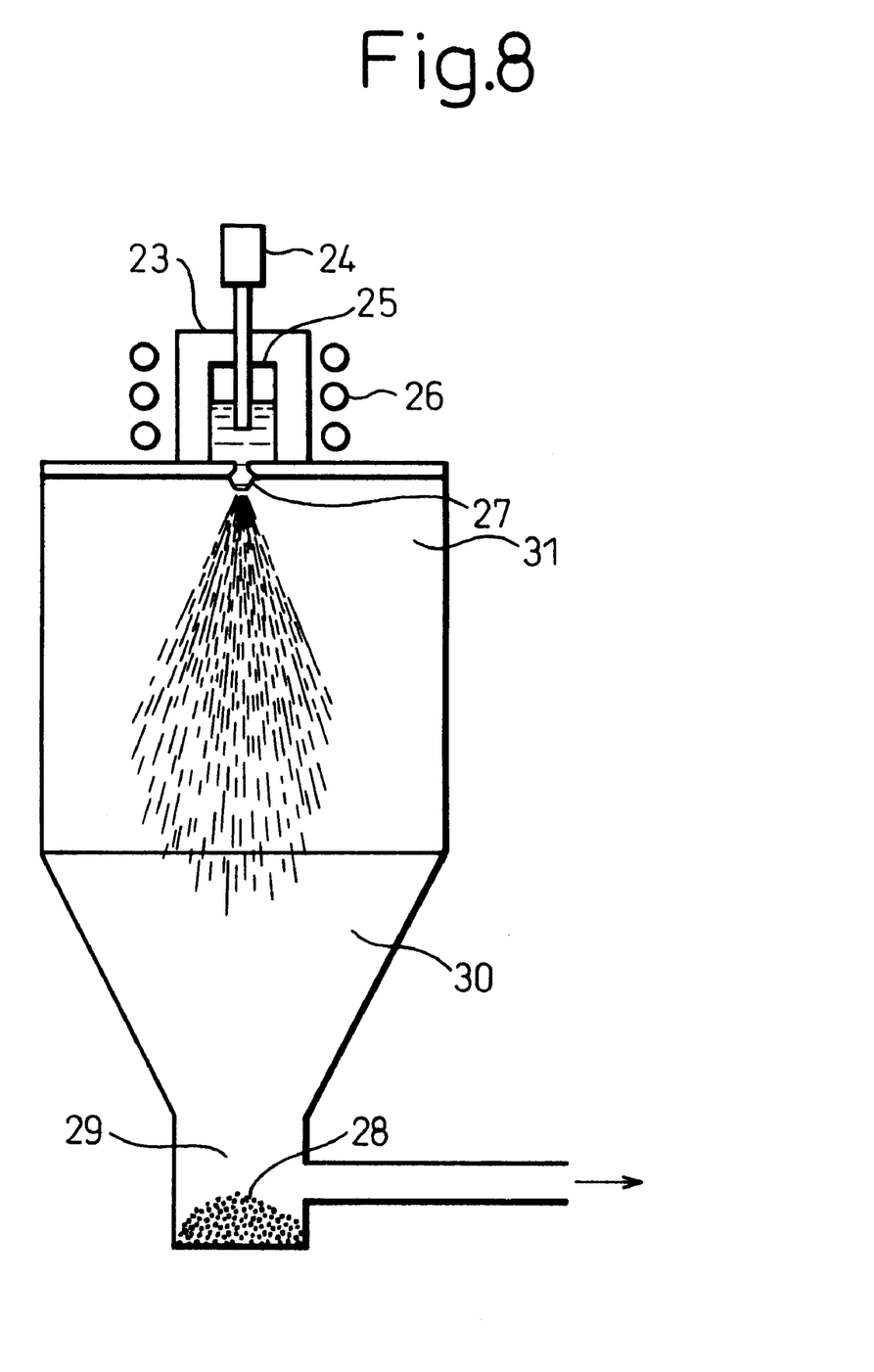
FIG. 8 is a view showing an outline of an apparatus relating to Example 5 of the present invention.

This example relates to a method of forming a protective film on hydrogen-absorbing alloy powder during gas atomization of the powder. In this example, the present invention is applied to producing a powder of an alloy of $Ti_{25}Cr_{35}V_{40}$ by the gas atomizing method. An outline of this apparatus is shown in FIG. 8. According to the gas atomizing method, there is provided an alloy melting device in the upper portion. A powder of the alloy is produced in such a manner that molten metal is injected from this alloy melting device into the injection chamber 30 via the injection nozzle 27, so that molten metal is quickly cooled by gas in the injection chamber 30. First, a hydrogen-absorbing alloy is put into the crucible 25 for melting arranged in the vacuum chamber 23, the atmosphere of which is composed of inert gas, and hydrogen-absorbing alloy is melted by the action of the induction heating coil 26. There is provided an injection nozzle 27 at the lower portion of this crucible 25 for melting. Molten metal supplied to this injection nozzle is adjusted by the molten metal stopper 24. At this time, the atmosphere in the injection chamber 30 was composed of $SF_6$ gas or inert gas containing $SF_6$ gas, wherein the composition of inert gas containing $SF_6$ gas was Ar+1 vf%$SF_6$. A protective film was formed on the surface of hydrogen-absorbing alloy powder 28 by utilizing heat obtained when molten metal was cooled in the process in which powder of high temperature was quickly cooled in $SF_6$ gas. Hydrogen-absorbing alloy powder accumulated in the recovery chamber 29 was recovered.

Tables 3 and 4 show the results of experiments in which the number of times of activation treatment conducted on the thus obtained powder, which had been left in the air, was investigated. In this case, the leaving of alloy powder in the atmosphere is defined as follows. Produced hydrogen-absorbing alloy powder is taken out into the atmosphere and left in the environment in which the temperature is kept at 30° C. and the humidity is left at 70%. The activation treatment condition is defined as a repetition of the cycle of vacuum drawing (60° C.×1 h) and pressurization of hydrogen (0° C., 1 MPa×1 h).

TABLE 3

| | No. | Composition of alloy (at %) | Method for producing powder | Atmosphere condition | Remark |
|---|---|---|---|---|---|
| Inventive example | 11 | Ti$_{25}$Cr$_{35}$V$_{40}$ | Gas atomization | Ar + 1 vf % SF$_6$ (Injected gas) | Example 5 |
| | 12 | " | Gas atomization | Ar + 1 vf % SF$_6$ (Cooling gas after heat treatment) | Example 6 |
| | 13 | " | Single roller rapidly cooling | Ar + 1 vf % SF$_6$ (Cooling gas after heat treatment) | Example 6 |
| | 14 | " | Gas atomization | Ar + 1 vf % SF$_6$ (Injected, cooling gas after heat treatment) | Example 7 |
| Comparative example | 15 | " | Roller mill | In air | |
| | 16 | " | " | Ar | |
| | 17 | " | Gas atomization | Ar | |

TABLE 4

(Continuation of Table 3)

| | No. | Heating condition | Number of times of activation treatment required after being left in air* |
|---|---|---|---|
| Inventive example | 11 | Heat utilized until molten metal is cooled | Once |
| | 12 | Remaining heat of homogenization heat treatment is utilized | Twice |
| | 13 | " | " |
| | 14 | Remaining heat of molten metal and homogenization heat treatment is utilized | Once |
| Comparative example | 15 | No | No activation is caused even after 10 times |
| | 16 | " | " |
| | 17 | " | " |

*Being left in the atmosphere: Produced hydrogen-absorbing alloy powder was taken out into air and left in the environment for one day in which the temperature was kept at 30° C. and humidity was kept at 70%.
Activation treatment: Cycle of vacuum drawing (60° C. × 1 h) and pressurization with hydrogen (0° C., 1 MPa × 1 h).

In this example, it was possible to provide an excellent hydrogen absorbing and desorbing characteristic by conducting activation treatment only once. In this connection, the present invention is applied to the gas atomizing method in this example, however, even when the present invention is applied to other rapidly cooling and solidifying methods such as a rotary disk method and a roller rapid-cooling method, the same effect can be obtained.

Example 6

This example relates to a method of forming a protective film on hydrogen-absorbing alloy powder during gas atomization of the powder. In this example, the present invention was applied to producing powder of an alloy of Ti$_{25}$Cr$_{35}$V$_{40}$. Powder of alloy of Ti$_{25}$Cr$_{35}$V$_{40}$ was produced by the inert gas atomizing method. Then, the present invention was applied to the process of heating treatment. That is, the present invention provides a heat treatment method for hydrogen-absorbing alloy powder in which SF$_6$ gas or an inert gas containing SF$_6$ gas is used as cooling gas in the process of heat treatment and after the completion of heat treatment in the case where heat treatment is conducted for the object of homogenization or other objects in the hydrogen-absorbing alloy powder, which is produced directly from molten metal, the same as the rotary disk method or roller rapid-cooling method except for the inert gas atomizing method.

Figure 9:
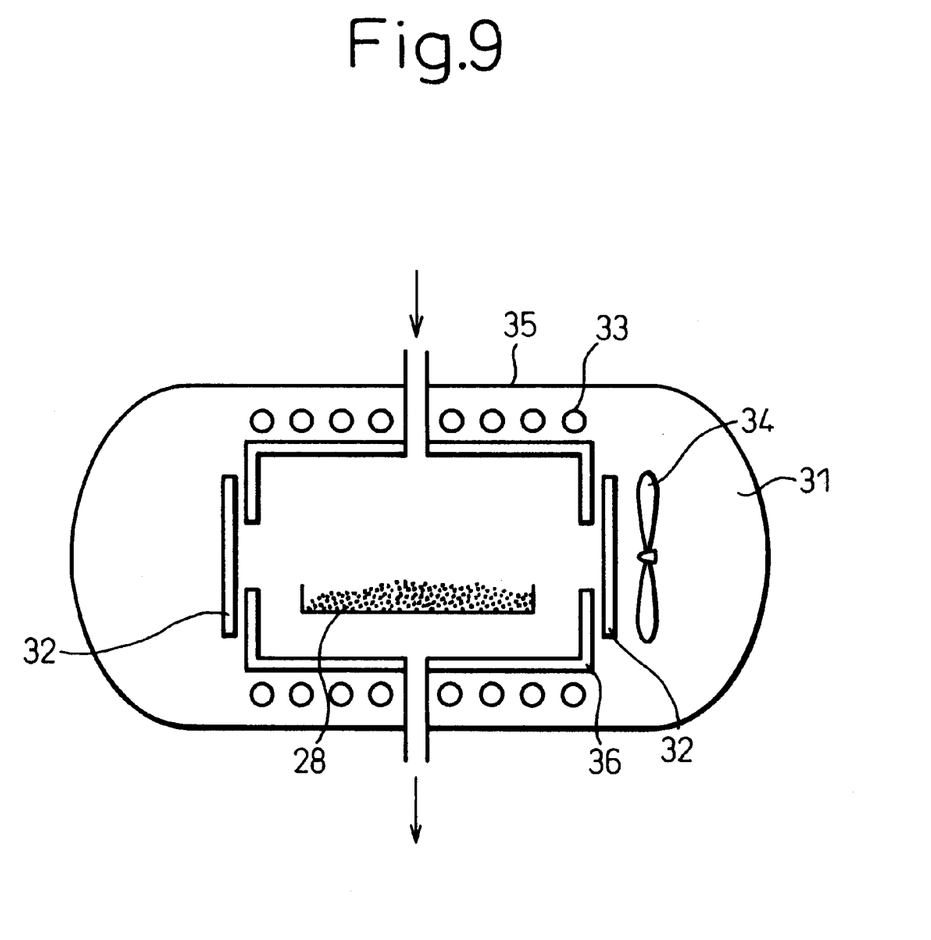
FIG. 9 is a view showing an outline of an apparatus relating to Example 6 of the present invention.

An outline of this device is shown in FIG. 9. In this view, there is provided hydrogen-absorbing alloy 28 in the chamber 35, wherein hydrogen-absorbing alloy 28 is surrounded by the heat-insulating material 36. At both ends of the heat-insulating material 36, there are provided heat-insulating doors 32, and gas in the chamber 35 is agitated by at least one gas circulating fan 34. The heat treatment temperature is controlled by the heater 33.

In Tables 3 and 4, there are shown a treatment condition of this example and a result of the investigation conducted on the activation characteristic of powder. As a result, when activation was conducted twice, it was possible to obtain a sufficiently high hydrogen absorbing and desorbing characteristic in any of the gas atomizing method and the single roller rapid-cooling method.

Except for the present example, when Mm (Misch metal) alloy is homogenized, heat treatment is conducted at about 1000° C., and when Ti alloy is homogenized, heat treatment is conducted at about 1200° C. However, when the heat treatment temperature is as high as described above, SF$_6$ gas reacts intensely with alloy powder, so that an excessively strong film is formed on the surface of powder. Therefore, such a high heat treatment temperature is not preferable.

Accordingly, when the heat treatment temperature exceeds 500° C., vacuum or an inert gas is used in the process of heat treatment in the same manner as that of the conventional example, and SF$_6$ gas or an inert gas containing SF$_6$ gas may be used only as cooling gas for heat treatment.

Example 7

This example relates to a method of forming a protective film on hydrogen-absorbing alloy powder during gas atomization of the powder. In this example, Examples 5 and 6 are combined with each other. That is, Ti$_{25}$Cr$_{35}$V$_{40}$ is used in this example, and the present invention is applied to producing alloy powder by the gas atomizing method. In this case, the atmosphere in the injection chamber 30 is composed of SF$_6$ gas or an inert gas containing SF$_6$ gas to obtain powder of alloy. Further, SF$_6$ gas or an inert gas containing SF$_6$ gas is used as cooling gas for cooling in the process of heat treatment and after the completion of heat treatment. In this way, hydrogen-absorbing alloy powder is subjected to heat treatment. Results of the experiment conducted by the above method are shown on Tables 3 and 4. When activation was conducted twice, it was possible to obtain a sufficiently high hydrogen absorbing and desorbing characteristic.

COMPARATIVE EXAMPLE

As a comparative example, an alloy of Ti$_{25}$Cr$_{35}$V$_{40}$ was used in the same manner as that of the example of the present invention. As a method of manufacturing a powder of an alloy, the roller mill method and the gas atomization method were adopted, and the atmosphere was composed of the air and Ar gas, and heating was not conducted. Results of the experiments are shown in Tables 3 and 4. As a result, even when activation treatment was conducted ten times, it was impossible to attain activation, and it was also impossible to obtain an appropriate hydrogen absorbing and emitting characteristic.

INDUSTRIAL APPLICABILITY

According to the present invention, the poisoning resistance of an alloy powder is enhanced. Therefore, even when hydrogen-absorbing metal is exposed to air or an atmosphere containing water, it is possible to conduct a sufficient hydrogenation activating treatment. Further, the present invention can provide the following advantages. When alloy powder is made of the hydrogen-absorbing alloy, the ductility of which is high, it is difficult to crush it mechanically. In this case, powder of the alloy is manufactured by hydrogenation-crushing, and the hydrogenation-crushing container can be used as the surface treatment container as it is. Therefore, the producing process can be simplified, that is, the producing process is excellent from the economical viewpoint. When the present invention is adopted, oxidation of the surface of the alloy can be prevented in the process of producing alloy powder, and at the same time it is possible to form a protective film on the surface of the alloy powder. By the effect of this protective film for protecting the surface of the alloy powder, the poisoning resistance of the hydrogen-absorbing alloy powder can be greatly enhanced. Since poisoning resistance of hydrogen-absorbing alloy powder is enhanced according to the present invention, even when the hydrogen-absorbing alloy is exposed to the air or an atmosphere containing water, hydrogenation activating treatment can be sufficiently conducted.

When the present invention is applied, it is possible to provide an oxidation preventing effect for preventing oxidation of the surface of alloy powder in the process of producing the alloy powder. Further, it is possible to form a protective film on the surface, which is the same as the protective film obtained when gas treatment in $SF_6$ is conducted, without adding a specific surface treatment process. By the effect of this protective film for protecting the surface of alloy, it is possible to greatly improve the poisoning resistance of hydrogen-absorbing alloy powder and it is also possible to enhance the activation characteristic and durability.

What is claimed is:

1. A method for producing hydrogen-absorbing titanium alloy powder having poisoning resistance, the method comprising contacting the hydrogen-absorbing alloy powder with $SF_6$ gas or an inert gas containing $SF_6$ gas so as to form a protective film containing at least one of sulfide or fluoride on the surface of the hydrogen-absorbing alloy powder.

2. The method for producing hydrogen-absorbing alloy powder according to claim 1, wherein the contacting step is carried out by heat treating crushed hydrogen-absorbing alloy powder in an atmosphere of $SF_6$ gas or an inert gas containing $SF_6$ gas so as to form the protective film containing at least one of sulfide and fluoride on the surface of the hydrogen-absorbing alloy powder.

3. The method for producing hydrogen-absorbing alloy powder according to claim 2, wherein the crushed hydrogen-absorbing alloy powder is obtained by conducting hydrogenation-crushing of the hydrogen-absorbing alloy powder in a container wherein the atmosphere in the container is hydrogen after which the heat treating is carried out by heating the crushed hydrogen-absorbing alloy powder in the container in which the atmosphere is $SF_6$ gas or an inert gas containing $SF_6$ gas.

4. The method for producing hydrogen-absorbing alloy powder according to claim 1, wherein the contacting step is carried out by crushing a hydrogen-absorbing alloy in a container wherein the atmosphere in the container is $SF_6$ gas or an inert gas containing $SF_6$ gas so as to form the protective film containing at least one of sulfide and fluoride in the surface of the hydrogen-absorbing alloy powder.

5. The method for producing hydrogen-absorbing alloy powder according to claim 4, further comprising heating the hydrogen-absorbing alloy powder during the crushing step.

6. The method for producing hydrogen-absorbing alloy powder according to claim 1, wherein a melt is injected from a container through an injection nozzle so that the melt can be rapidly cooled and solidified to form hydrogen-absorbing alloy powder, and the contacting step is carried out by cooling the hydrogen-absorbing alloy powder in an atmosphere of $SF_6$ gas or an inert gas containing $SF_6$ gas.

7. The method for producing hydrogen-absorbing alloy powder according to claim 1, wherein molten metal is injected by an injection nozzle from a container accommodating the molten metal so that the molten metal can be rapidly cooled and solidified and made into the hydrogen-absorbing alloy powder, and the contacting step is carried out by heating the hydrogen-absorbing alloy powder in an atmosphere of $SF_6$ gas or an inert gas containing $SF_6$ gas.

8. The method for producing hydrogen-absorbing alloy powder according to claim 1, wherein molten metal is injected by an injection nozzle from a container accommodating the molten metal into an atmosphere of $SF_6$ gas or inert gas containing $SF_6$ gas so that the molten metal can be rapidly cooled and solidified and made into the hydrogen-absorbing alloy powder, and the contacting step is carried out by heating the thus obtained hydrogen-absorbing alloy powder in an atmosphere of $SF_6$ gas or an inert gas containing $SF_6$ gas.

9. The method for producing hydrogen-absorbing alloy powder according to claim 1, wherein the contacting step is carried out while heating the titanium alloy powder to a temperature in the range of 400 to 800° C.

10. The method for producing hydrogen-absorbing alloy powder according to claim 1, wherein the titanium alloy is a ternary alloy which includes Cr and/or V.

11. The method for producing hydrogen-absorbing alloy powder according to claim 1, wherein the titanium alloy powder includes at least one of Cr, V, Mn, Mo and W.

12. The method for producing hydrogen-absorbing alloy powder according to claim 1, wherein the titanium alloy powder consists essentially of $Ti_{25}Cr_{35}V_{40}$, $Ti_{33}Mn_{30}V_{37}$, $Ti_{36}Cr_{57}Mo_7$ or $Ti_{41}Cr_{56}W_9$.

* * * * *